US012589555B2

(12) United States Patent
Chaeichian et al.

(10) Patent No.: US 12,589,555 B2
(45) Date of Patent: Mar. 31, 2026

(54) DIRECT APPLICATION OF THERMOSETTING COMPOSITE SURFACING FILMS TO UV-TREATED THERMOPLASTIC SURFACES AND RELATED COMPOSITE STRUCTURES

(71) Applicant: Henkel AG & Co. KGaA, Duesseldorf (DE)

(72) Inventors: Sina Chaeichian, Walnut Creek, CA (US); Kaspar Schaerer, Walnut Creek, CA (US); Ruairi O'Kane, Oakland, CA (US); Li Li, Walnut Creek, CA (US); Michael D. Halbasch, Antioch, CA (US); Martin Renkel, Duesseldorf (DE); Omar L. Abu-Shanab, Rochester Hills, MI (US); Brian Deegan, Blessington (IE); Anna Esmeralda Javier, Eden Prairie, MN (US)

(73) Assignee: Henkel AG & Co. KGaA, Duesseldorf (DE)

( * ) Notice: Subject to any disclaimer, the term of this patent is extended or adjusted under 35 U.S.C. 154(b) by 140 days.

(21) Appl. No.: 17/453,588

(22) Filed: Nov. 4, 2021

(65) Prior Publication Data

US 2022/0212418 A1 Jul. 7, 2022

Related U.S. Application Data

(63) Continuation of application No. PCT/US2020/070021, filed on May 4, 2020.
(Continued)

(51) Int. Cl.
B29C 65/00 (2006.01)
B32B 5/02 (2006.01)
(Continued)

(52) U.S. Cl.
CPC .......... *B29C 66/712* (2013.01); *B29C 66/028* (2013.01); *B29C 66/45* (2013.01);
(Continued)

(58) Field of Classification Search
None
See application file for complete search history.

(56) References Cited

U.S. PATENT DOCUMENTS 3,655,423 A 4/1972 Lin et al.
6,194,061 B1 2/2001 Satoh et al.
(Continued)

FOREIGN PATENT DOCUMENTS

CN 1265698 A 9/2000
CN 111492026 A 8/2020
(Continued)

OTHER PUBLICATIONS

International Search Report for PCT/US2020/070020 mailed Aug. 24, 2020.
(Continued)

*Primary Examiner* — Samir Shah
(74) *Attorney, Agent, or Firm* — Mary K. Cameron

(57) ABSTRACT

This disclosure is directed to methods directly adhering epoxy-based, and other thermosetting surfacing films to solid thermoplastic surfaces and the structures derived or derivable from these methods. In some embodiments, the disclosure is also directed to composite structures comprising a thermoplastic substrate directly bonded to a thermoset (ting) surfacing film; wherein the direct bonding defines an interface between a thermoplastic surface of the thermoplastic substrate and a first surface of the thermoset(ting) surfacing film.

21 Claims, 1 Drawing Sheet

Related U.S. Application Data

(60) Provisional application No. 62/846,074, filed on May 10, 2019.

(51) Int. Cl.

| | |
|---|---|
| *B32B 27/08* | (2006.01) |
| *B32B 27/12* | (2006.01) |
| *B32B 27/18* | (2006.01) |
| *B32B 27/28* | (2006.01) |
| *B29L 31/30* | (2006.01) |

(52) U.S. Cl.

CPC ........ *B29C 66/73141* (2013.01); *B32B 5/024* (2013.01); *B32B 27/08* (2013.01); *B32B 27/12* (2013.01); *B32B 27/18* (2013.01); *B32B 27/285* (2013.01); *B29K 2995/0005* (2013.01); *B29K 2995/0007* (2013.01); *B29L 2031/3076* (2013.01); *B32B 2264/10* (2013.01); *B32B 2307/212* (2013.01)

(56) References Cited

U.S. PATENT DOCUMENTS

| | | | |
|---|---|---|---|
| 2003/0159915 A1 * | 8/2003 | Jing | C08J 5/124 |
| | | | 428/480 |
| 2009/0104410 A1 | 4/2009 | Siegel et al. | |
| 2009/0227755 A1 | 9/2009 | Devoe et al. | |
| 2010/0112518 A1 | 5/2010 | Engelbrecht et al. | |
| 2014/0162020 A1 | 6/2014 | Wang et al. | |
| 2014/0220356 A1 * | 8/2014 | Van Tooren | B29C 66/723 |
| | | | 428/419 |
| 2014/0234579 A1 | 8/2014 | Wang et al. | |
| 2018/0037703 A1 | 2/2018 | Richardson et al. | |
| 2020/0239655 A1 | 7/2020 | Deegan | |
| 2021/0198535 A1 | 7/2021 | Hebert et al. | |

FOREIGN PATENT DOCUMENTS

| | | | |
|---|---|---|---|
| FR | 3026982 A1 | 4/2016 | |
| GB | 2321025 A | 7/1998 | |
| JP | H05132569 A | 5/1993 | |
| JP | H093221 A | 1/1997 | |
| JP | H11334011 A | 12/1999 | |
| JP | 2000226536 A | 8/2000 | |
| JP | 2000267487 A | 9/2000 | |
| JP | 2005212107 A | 8/2005 | |
| JP | 2006016685 A | 1/2006 | |
| JP | 2006203114 A | 8/2006 | |
| JP | 2014093176 A | 5/2014 | |
| JP | 2015034285 A | 2/2015 | |
| JP | 2017210621 A | 11/2017 | |
| JP | 6270028 B2 | 1/2018 | |
| JP | 2019001151 A | 1/2019 | |
| WO | 2016097654 A1 | 6/2016 | |
| WO | 2017110991 A1 | 6/2017 | |
| WO | 2017154718 A1 | 9/2017 | |
| WO | 2017170445 A1 | 10/2017 | |
| WO | 2018228893 A1 | 12/2018 | |
| WO | 2019123393 A1 | 6/2019 | |
| WO | 2020228893 A1 | 11/2020 | |

OTHER PUBLICATIONS

International Search Report for PCT/US2020/070021 mailed Aug. 26, 2020.

Iqbal H. M. S., et al: "Surface modification of high Performance polymers by atmospheric pressure plasma and failure mechanism of adhesive bonded joints", International Journal of Adhesion and Adhesives, Elsevier, Amsterdam, NL, vol. 30, No. 6, Apr. 9, 2010 (Apr. 9, 2010), pp. 418-424, XP027118608, ISSN: 0143-7496 [retrieved on Apr. 9, 2010], the whole document.

Supplementary EP Search Report for EP 20806389 dated Dec. 14, 2022.

Sandner, Horst, "Effects of surface pre-treatment on adhesive bonding of Victrex Peek", Victrex Europa GmbH, Oct. 25, 1999, 4 pages.

Giancaterina, S., Rossi, A., Rivaton, A, Gardette, J.L., "Photochemical evolution of poly(ether ether ketone)", Polymer Degradation and Stability 68 (2000) 133-144 (Year 2000), Copyright 2000 Elsevier Science Ltd.—Cited in related co-pending U.S. Appl. No. 17/453,539.

Pape, Peter G., "Adhesion Promoters: Silane Coupling Agents" in Applied Plastics Engineering Handbook—Processing and Materials, Ed: Kutz, Myer. Elsevier (2011) . Retrieved from https://app.knovel.com/hotlink/toc/id:kpAPEHPM0D/applied-plastics-engineering/applied-plastics-engineering (Year: 2011), Chapter 29, pp. 503-517, Elsevier, Inc.—Cited in related co-pending U.S. Appl. No. 17/453,539.

Pham, H.Q. and Marks, M.J., Epoxy Resins in Ullmann's Encyclopedia of Industrial Chemistry, Epoxy Resins in Ullmann's Encyclopedia of Industrial Chemistry, (Ed.). https://doi.org/10.1002/14356007.a09_547.pub2 (Year 2005), vol. 13, pp. 155-244—Cited in related co-pending U.S. Appl. No. 17/453,539.

Supplementary EP Search Report, EP 20806477.4 dated Apr. 24, 2023.

Kern, M. et al., Influence of surface conditioning on bonding to polyetheretherketon (Peek), Dental Materials 28, pp. 1280-1283 (Year 2012), Published by Elsevier Ltd.—Cited in related co-pending U.S. Appl. No. 17/453,539.

"Luxatemp Fluorescence" by the Dental Advisor, Accessed 2023, (Year: 2023), 2 pages—Cited in related co-pending U.S. Appl. No. 17/453,539.

"Clearfil Ceramic Primer" by Kuraray America, Inc. (Year: 2008), 2 pages—Cited in related co-pending U.S. Appl. No. 17/453,539.

"Designation: D3359-09 Standard Test Methods for Measuring Adhesion by Tape Test" by ASTM. (Year: 2023)—Cited in related co-pending U.S. Appl. No. 17/453,539.

"Ultraviolet Laser Technology and Applications"—Chapter 1—Ultraviolet Light, Academic Press, 1995, pp. 16-32, Ed. David J. Elliott, ISBN 9780122370700. (Year: 1995), Academic Press—Cited in prosecution of co-pending U.S. Appl. No. 17/453,539.

"Surfacing Films Improve Safety, Appearance and Processing Time", edited by CompositesWorld, published May 1, 2018. Available at https://www.compositesworld.com/articles/surfacing-films-improve-safety-appearance-and processing-time (Year: 2018)—Cited in prosecution of co-pending U.S. Appl. No. 17/453,539.

\* cited by examiner

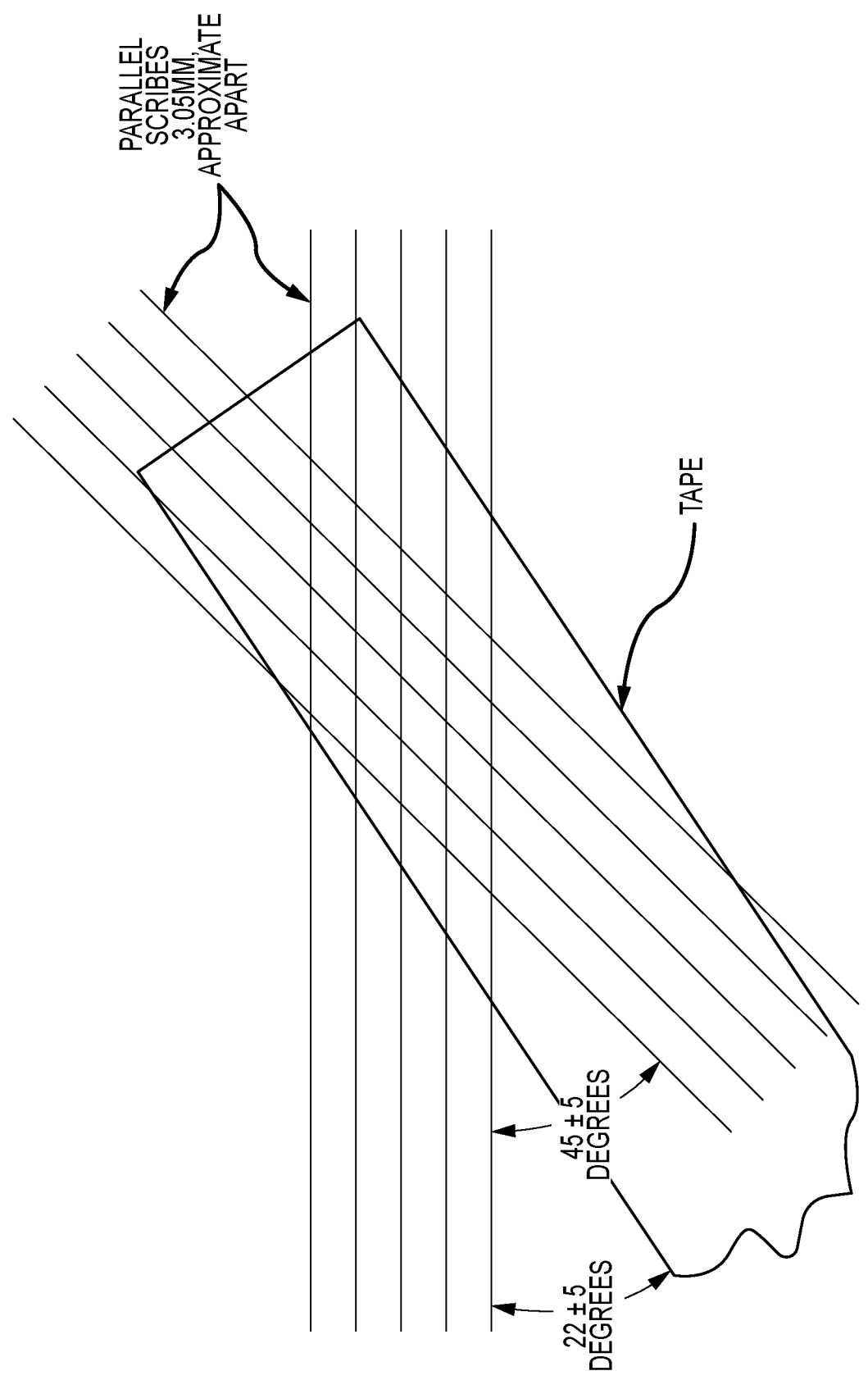

1

DIRECT APPLICATION OF THERMOSETTING COMPOSITE SURFACING FILMS TO UV-TREATED THERMOPLASTIC SURFACES AND RELATED COMPOSITE STRUCTURES

CROSS REFERENCE TO RELATED APPLICATIONS

None.

TECHNICAL FIELD

This disclosure is directed to methods directly adhering epoxy-based, and other thermosetting surfacing films to solid thermoplastic surfaces and the structures derived or derivable from these methods.

BACKGROUND

Fiber-reinforced, polymer matrix composites are high-performance structural materials that are commonly used aircraft components, high performance automobiles, boat hulls, and bicycle frames, owing to their resistance to aggressive environments, their high specific strength or high strength to density ratio, and their low weight.

Conventional composite structures used in the aerospace industry typically include a surfacing film to provide the required performance characteristics to the composite structures prior to painting. Surfacing films, such as epoxy-based films, are often applied to outer surfaces of polymer composite articles to provide the composites with the surface quality required for aerospace applications. For example, surfacing films may be co-cured with prepregs to provide a substantially porosity free surface that protects wherein the resistivity of the surfacing film is less than the underlying substrate, while reducing labor, time, and cost of composite manufacturing. Further, these surfacing films may be functionalized, for example, to improve their resistance to lightning strikes, electrostatic discharge, and electromagnetic discharge.

But it is not always possible to co-cure or otherwise bond these surfacing films with the structural elements of the polymer matrix composite materials during the manufacturing of the structural parts. Some structural elements are not made of composite materials that cure, which makes such bonding to these materials particularly challenging, because the intermingling process that occurs during bonding is not possible due to the very high melting points of the thermoplastic materials used in aerospace applications.

It is also known in the adhesives industry that certain substrates, such as certain high-performance plastics, are difficult to bond. Thermoplastics, such as PEEK (polyether ether ketone); PPS (polyphenylene sulfide); polyarylamide (PARA) or polyetherimide (PEI), are attractive structural polymers for their high specific strength or high strength to density ratio but are also characterized by their poor bonding characteristics. At least one reason is believed to be low surface energy properties of the plastic to be bonded.

To allow bonding of surfacing films to such low-energy surfaces, several strategies have been developed, including chemical priming, the use of chemical adhesive compositions specifically formulated for use to bond such substrates, physical abrasion or chemical roughening, flame treatment, and acid or plasma etching, to make the surfaces more susceptible to bonding before the application of adhesive or paint. However, each of these methods carry trade-offs that need to be considered.

It will be appreciated that chemical treatments such as acid etching or chemical activation are restrictive in terms of commercial usage due to safety and waste handling concerns, process control, and cost.

Plasma techniques require large-scale equipment. Apart from the capital cost there is a difficulty with the size of the equipment which makes it difficult to be portable for use, for example in confined spaces.

Physical abrasion can also give variable results, as it can be difficult to control this method sufficiently and carry with it issues with waste abraded by-product.

While primers can be used to great effect there is always a need for an alternative method of activating a surface for subsequent bonding. This applies in particular to PEEK, PARA, PPS or PEI which tend to be difficult to bond plastics and thus typically bond strengths tend to be lower than for other plastics—and this generally applies even when primers are used.

Notwithstanding that state of the art proposed solutions to these issues exist, it is desirable to provide alternative solutions, so the end user has more choices available.

SUMMARY

This disclosure is directed to composite structures comprising thermoset(ting) surfacing films directly bonded to thermoplastic substrates, methods for making these composite structures, and articles comprising these composite structures.

In certain embodiments, the composite structure comprises a thermoplastic substrate directly bonded to a thermoset(ting) surfacing film; wherein the direct bonding defines an interface between a thermoplastic surface of the thermoplastic substrate and a first surface of the thermoset (ting) surfacing film, the thermoset(ting) surfacing film further comprising a second surface opposite the first surface the thermoset(ting) surfacing film.

The definition of the thermoplastic substrates is set forth elsewhere herein. While not necessarily restricted as such, in certain more specific embodiments, the thermoplastic substrate comprises:

(a) polyaryletherketone such as polyether ether ketone (PEEK) polyether ketone ketone (PEKK), polyether ketone (PEK); polyether ether ketone ketone (PEEKK); or polyether ketone ether ketone ketone (PEKEKK);

(b) a polymer containing a phenyl group directly attached to a carbonyl group, optionally wherein the carbonyl group is part of an amide group, such as polyarylamide (PARA);

(c) a polyphenylene sulfide (PPS);

(d) a polyphenylene oxide (PPO); or (e) a polyetherimide (PEI).

Additionally or alternatively, the thermoplastic substrate comprises a thermoplastic polymer comprising some chemical bonds that are susceptible to at least partial photolytic cleavage upon irradiation by actinic radiation of sufficient intensity and duration. In certain of these embodiments, the actinic radiation includes radiation with at least one wavelength in the range from about 10 nm to about 500 nm or about 100 nm to about 450 nm, preferably in a range of from about 200 nm to about 350 nm.

Additionally or alternatively, the thermoplastic substrate comprises a thermoplastic polymer whose linkages are susceptible to at least partial photolytic cleavage upon irradiation by at least one wavelength of actinic radiation at an energy in a range from about 0.1 $J/cm^2$ to about 300 $J/cm^2$ at the at least one wavelength preferably in the range from about 0.5 $J/cm^2$ to about 250 $J/cm^2$, or from about 1.5 $J/cm^2$ to about 250 $J/cm^2$ at the at least one wavelength.

Within the composite structure comprising the thermoset (ting) surfacing films directly bonded to thermoplastic substrates, the thermoset(ting) surfacing film may be uncured (e.g., as first prepared) or partially cured (e.g., after some post-processing). The thermoset(ting) surfacing film adhered to the thermoplastic substrate or surface has a higher degree of curing than the thermoset(ting) surfacing film as-supplied.

In preferred embodiments, the thermoset(ting) surfacing film is an epoxy-based thermoset(ting) surfacing film. Various types of epoxy-based surfacing films are described herein.

As composite materials themselves, the surfacing films used or adhered to the substrate as disclosed herein, in some embodiments, comprise one or more organic, inorganic, or metallic additives which are incorporated into a polymer or pre-polymer matrix, for example additives such as flow agent, rheology modifiers, density modifiers, impact modifiers, preservatives, pigment, colorant, and the like.

Alternatively, or additionally, the surfacing films may comprise at least one particulate filler or additive comprising nano-, micro-, and/or macro-dimensioned powders, particles, beads, flakes, whiskers, or fibers. These forms, depending on material and function of the specific materials.

Alternatively, or additionally, the surfacing films may comprise one or more organic or inorganic fibers, fabrics, weaves, meshes, or porous sheets contained within a thermoset(ting) resin or polymer. In certain of these embodiments, the thermoset(ting) surfacing film comprises one or more peelable organic or inorganic fabrics, weaves, meshes, or porous sheets disposed at or beneath the second surface of the thermoset(ting) surfacing film.

Alternatively, or additionally, the surfacing films may comprise at least one electrically conductive material, suitable to use in lightning strike protection, electric current dissipation, EMI shielding, or heat transfer applications.

Alternatively, or additionally, the thermoset(ting) surfacing film is adhered to the thermoplastic substrate directly bonded to a thermoset(ting) surfacing film at a strength sufficient to score at least a 3B, 4B, or 5B for a 45° cross-hatched tape test according to ASTM D3359-09, the conditions of which are described more fully in the Examples.

Still other embodiments include those methods of preparing a direct-bonded thermoplastic-thermoset(ting) composite structure. In certain of these, the methods comprise:

(a) irradiating a surface of a thermoplastic substrate with actinic radiation sufficient to activate the surface of the thermoplastic substrate;

(b) contacting a thermosetting or thermosettable surfacing film to the activated thermoplastic substrate surface; and (c) applying pressure, and optionally heat, to the thermosetting or thermosettable surfacing film against the thermoplastic substrate for a time and under conditions sufficient to form a direct bond between the thermoplastic substrate and the thermosetting or thermosettable surfacing film. The methods may further comprise curing the thermosetting or thermosettable surfacing film thereby forming a composite structure comprising a thermoplastic substrate directly bonded to a thermoset (ting) surfacing film.

As referring to the methods, the natures of the substrates, surfacing films, and methods of activating the bonds therebetween are consistent with the composite structures described elsewhere and are not reiterated further here. Other aspects of the methods (e.g., pressure and heat treatments) are further described elsewhere herein.

Still further aspects of the present disclosure include those articles comprising these disclosed composite structures and include components or aircraft and land-based vehicles, such as automobiles.

BRIEF DESCRIPTION OF THE DRAWINGS

The present application is further understood when read in conjunction with the appended drawings. For illustrating the subject matter, there are shown in the drawings exemplary embodiments of the subject matter; however, the presently disclosed subject matter is not limited to the specific methods, devices, and systems disclosed. In addition, the drawings are not necessarily drawn to scale. In the drawings:

FIG. 1 illustrates the 45-degree cross-hatch scribe and tape position for an adhesion test described herein.

DETAILED DESCRIPTION OF ILLUSTRATIVE EMBODIMENTS

The present disclosure is directed to new compositions of matter, including composite structures comprising a thermoplastic substrate directly bonded to a thermoset(ting) surfacing film, and methods of making and using these compositions.

The present disclosure may be understood more readily by reference to the following description taken in connection with the accompanying FIGURES and Examples, all of which form a part of this disclosure. It is to be understood that this disclosure is not limited to the specific products, methods, conditions or parameters described or shown herein, and that the terminology used herein is for describing particular embodiments by way of example only and is not intended to be limiting of any claimed invention. Similarly, unless specifically otherwise stated, any description as to a possible mechanism or mode of action or reason for improvement is meant to be illustrative only, and the disclosure herein is not to be constrained by the correctness or incorrectness of any such suggested mechanism or mode of action or reason for improvement. Throughout this text, it is recognized that the descriptions refer to compositions and methods of making and using said compositions. That is, where the disclosure describes or claims a feature or embodiment associated with a composition or a method of making or using a composition, it is appreciated that such a description or claim is intended to extend these features or embodiment to embodiments in each of these contexts (i.e., compositions, methods of making, and methods of using).

Composite Structures

The present disclosure includes those embodiments of composite structures, wherein the composite structure comprises a thermoplastic substrate directly bonded to a thermoset(ting) surfacing film. As used herein, the term "direct bonding," and its grammatical variations, defines an interface between a thermoplastic surface of the thermoplastic substrate and a first surface of the thermoset(ting) surfacing film, wherein the thermoplastic surface and the first surface are adhered to each other at a surface that forms a common boundary of the thermoplastic surface and the first surface and preferably in the absence of any material not sourced from the thermoplastic surface and the first surface. The term "direct bonded" may likewise refer to a mechanism in which the bonding is achieved between the pendant functional group derived from the activation of a polymer moiety in the thermoplastic substrate bonds directly to a complementary bonding moiety in the thermoset(ting) surfacing film, with the present of an intermediary linking group (e.g., without external adhesives or similar compositions).

The thermoset(ting) surfacing film further comprising a second surface opposite the first surface of the thermoset (ting) surfacing film. This second surface may be optionally functionalized as set forth elsewhere herein.

As described herein, the bonding between the thermoplastic substrate and the thermoset(ting) surfacing film is described as that wherein the thermoplastic substrate is directly bonded to a thermoset(ting) surfacing film. Equally, this bonding can be described as wherein the thermoset(ting) surfacing film is directly bonded to the thermoplastic substrate, or the wherein the thermoset(ting) surfacing film and the thermoplastic substrate are directly bonded together. Such distinctions are merely semantic, and descriptions should be considered equivalent throughout.

Thermoplastic Substrates

In the context of the present disclosure, the thermoplastic substrate comprises a thermoplastic polymer as is generally understood by those skilled in the art of polymer chemistry, but in preferred embodiments, the thermoplastic substrate comprises those thermoplastic polymers typically used in the aerospace industry.

Even in this context, the thermoplastic polymer of the thermoplastic substrate is broadly defined, but it appears that those thermoplastic polymers comprising linkages that are susceptible to photolytic cleavage upon irradiation by actinic radiation of sufficient intensity are preferred. Such linkages include linkages comprising heteroatoms, such as —O—, —S—, —C(O)—, —S(O)—, —S(O)$_2$—, —C(O)O—, —C(O)—N—, or combinations thereof. Such thermoplastic polymers include, but are not limited to, as independent embodiments, one or more of:

(a) a polyaryletherketone such as a polyether ether ketone (PEEK), polyether ketone ketone (PEKK), polyether ketone (PEK); polyether ether ketone ketone (PEEKK); or polyether ketone ether ketone ketone (PEKEKK);

(b) a polymer containing a phenyl group directly attached to a carbonyl group, optionally wherein the carbonyl group is part of an amide group, such as polyarylamide (PARA);

(c) a polyphenylene sulfide (PPS);

(d) a polyphenylene oxide (PPO); or (e) a polyetherimide (PEI).

Each of these polymers may comprise pendants in addition to the linking groups, such that, for example, the term "a polyether ether ketone (PEEK)" refers to both substituted and unsubstituted (e.g., by alkyl groups) PEEK polymers.

As described elsewhere herein, the thermoplastic substrate can also be, and generally is, a composite material, in which the thermoplastic polymer further comprises organic and/or inorganic additives such as flow agents, rheology modifiers, density modifiers, preservatives, pigment, colorant, and the like. The thermoplastic substrate is typically a structurally reinforced material, optionally comprising fibers, meshes, fabrics, or porous sheets contained within the polymer matrix, and is preferably a fiber reinforced composite material comprising multiple layers of polymer composites containing oriented fibers, etc. (e.g., carbon fibers), arranged in laminated stacks, such that the fibers in adjoining or alternate layers are oriented transverse to one another.

Where the interface is described as between a "thermoplastic surface of the thermoplastic substrate and a first surface of the thermoset(ting) surfacing film," the thermoplastic surface is the same as or chemically consistent with the thermoplastic polymer of the thermoplastic substrate. In this regard, the term "chemically consistent with" means that the polymer building blocks of the substrate and those of the surface are substantially the same, even if some of the bonding sites of the surfaces have been altered by photolytic activation.

Where the thermoplastic polymers are described as comprising linkages that are susceptible to photolytic cleavage upon irradiation by actinic radiation of sufficient intensity, in some embodiments, that actinic radiation includes radiation with at least one wavelength in the range from about 10 nm to about 500 nm or about 100 nm to about 450 nm, preferably in a range of from about 200 nm to about 350 nm. In additional embodiments, that actinic radiation includes radiation with one or more wavelength in the range from about 100 nm to 125 nm, from 125 to 150 nm, from 150 nm to 175 nm, from 175 nm to 200 nm, from 200 nm to 225 nm, from 225 nm to 250 nm, from 250 nm to 275 nm, from 275 nm to 300 nm, from 300 nm to 325 nm, from 325 nm to 350 nm, from 350 nm to 375 nm, from 375 nm to 400 nm, from 400 nm to 425 nm, from 425 nm to 450 nm, from 475 nm to 500 nm, or a range that is defined by any two or more of the foregoing ranges, for example from 300 nm to 400 nm, or from 275 nm to 325 nm. In other embodiments, the actinic radiation includes light or radiation with at least one wavelength characterized as UV-A (about 315-400 nm, or 320-390 nm) and UV-B (280-315 nm, or 280-320 nm). In other embodiments, the actinic radiation includes light or radiation with at least one wavelength characterized as UV-C (about 100-280 nm), UV-V (395-445 nm), near ultraviolet (NUV; 300-400 nm), middle ultraviolet (MUV; 200-300 nm), far ultraviolet (FUV; 122-200 nm), vacuum ultraviolet (VUV; 10-200 nm), or extreme ultraviolet (EUV; 10-120 nm).

Where the thermoplastic polymers are described as comprising linkages that are susceptible to photolytic cleavage upon irradiation by actinic radiation of sufficient intensity, in some embodiments, those polymers include those that are activated by at least one wavelength of actinic radiation at an energy in a range from about 0.1 J/cm$^2$ to about 300 J/cm$^2$ at the at least one wavelength preferably in the range from about 0.5 J/cm$^2$ to about 250 J/cm$^2$, or from about 1.5 J/cm$^2$ to about 250 J/cm$^2$ at the at least one wavelength. Additional embodiments include those where the activating energies are defined by one or more ranges of from 0.1 to 0.5 J/cm$^2$, from 0.5 to 1 J/cm$^2$, from 1 to 1.5 J/cm$^2$, from 1.5 to 2 J/cm$^2$, from 2 to 2.5 J/cm$^2$, from 2.5 to 3 J/cm$^2$, from 3 to 3.5 J/cm$^2$, from 3.5 to 4 J/cm$^2$, from 4 to 4.5 J/cm$^2$, from 4.5 to 5 J/cm$^2$, from 5 to 5.5 J/cm$^2$, from 5.5 to 6 J/cm$^2$, from 6 to 6.5 J/cm$^2$, from 6.5 to 7 J/cm$^2$, from 7 to 7.5 J/cm$^2$, from 7.5 to 8 J/cm$^2$, from 8 to 9 J/cm$^2$, from 9 to 10 J/cm$^2$, from 10 to 25 J/cm$^2$, from 25 to 50 J/cm$^2$, from 50 to 100 J/cm$^2$, from 100 to 150 J/cm$^2$, from 150 to 200 J/cm$^2$, from 200 to 250 J/cm$^2$, from 250 to 300 J/cm$^2$, or the range is defined by any two or more of the foregoing ranges, for example from 0.1 to 250 J/cm$^2$, or from 0.5 to 100 J/cm$^2$. The simultaneous or sequential irradiating by two, three, four, or more wavelengths or ranges of wavelengths are also seen as further independent embodiments.

Thermoset(ting) Surfacing Films

In the context of the present disclosure, the thermoset (ting) surfacing film comprises a thermoset(ting) polymer as is generally understood by those skilled in the art of polymer chemistry, but in preferred embodiments, the thermoset (ting) surfacing film comprises those (pre-)polymer systems typically used in this context in the aerospace industry—e.g., comprising benzoxazines, bismaleimides, an epoxies, (meth)acrylates, (meth)acrylamides, polyamides, polyimides, polyurethanes, vinyl esters, or a copolymer or mixture thereof.

Epoxy-based thermoset(ting) surfacing films appear to be preferred, both in terms of function/performance and workability. In this context, in specific embodiments, the epoxy-based surfacing films include epoxy resins that include, but are not limited to one or more of diglycidyl ether of Bisphenol A, F, S, E, and M resins; epoxy novolacs; glycidyl ethers of mononuclear, di, trihydric, and polynuclear phenols; glycidyl ethers of tetraphenolethane; hydroxyl phenyl methane based epoxy resins; naphthalene based epoxy resins; triglycidylether of amino-phenol resins; tetraglycidylether of methylenedianiline resins; glycidyl ethers of aliphatic polyols; cycloaliphatic epoxy resins; modified grades of all epoxy types (containing Halogen, Silicon, Phosphorus); toughened grades/Adducts of all epoxy types with rubbers (such as butadiene, butadiene acrylonitrile copolymers). The inventors have seen good results with Loctite® EA 9845 Aero, Loctite® EA 9845 LC, Loctite® EA 9845 P&P, Loctite® EA 9845 LC P&P, and Loctite® EA 9837.1 epoxy-based composite surfacing film in the present methods, especially but not exclusively with PEEK substrates, and so these are considered preferred embodiments. In other independent embodiments, epoxy-based surfacing films designated as Loctite EA 9837.1 Aero, Loctite EA 9837.1 BLK Aero, Loctite EA 9837.1 LS Aero, Loctite EA 9845 Aero, Loctite EA 9845 LC Aero, Loctite EA 9845 LA Aero. Loctite EA 9845 P&P Aero, and Loctite EA 9845 LC P&P, and TenCate TC235SF-1, Aeroglide surfacing films, Surface Master 905 from Cytec, and Redux 641 from Hexcel can also be used in these applications.

Independent embodiments include those where the thermoset(ting) surfacing films are not yet cured, partially cured, or fully cured when adhered to the thermoplastic surface. Each of these cure stages may appear at different stages of processing.

Typically, the thermoset(ting) surfacing film has a total thickness, as applied, in a range of from 12.5 to 12,500 microns (0.5 to 500 mils), preferably from 12.5 to 1250 microns (0.5 to 50 mils). In other embodiments, the total thickness may be described in terms of a range of from 12.5 to 25 microns, from 25 to 50 microns, from 50 to 75 microns, from 75 to 100 microns, from 100 to 125 microns, from 125 to 150 microns, from 150 to 175 microns, from 175 to 200 microns, from 200 to 250 microns, from 250 to 300 microns, from 300 to 400 microns, from 400 to 450 microns, from 450 to 500 microns, from 500 to 1000 microns, from 1000 to 1500 microns, from 1500 to 2000 microns, from 2000 to 2500 microns, from 2500 to 5000 microns, from 5000 to 7500 microns, from 7500 to 10,000 microns, from 10,000 to 12,500 microns, or a combination of two or more of these ranges, for example, from 25 to 500 microns, from 50 to 300 microns, or from about 25 to 125 microns.

In other embodiments, the thermoset(ting) surfacing film can have an areal mass in a range of from 0.005 to 0.15 lb./ft$^2$ (psf) or from 24 g/m$^2$ to 730 g/m$^2$. Alternatively, or additionally, or this areal mass may be defined by one or more ranges of from 25 to 50 g/m$^2$, from 50 to 100 g/m$^2$, from 100 to 200 g/m$^2$, from 200 to 300 g/m$^2$, from 300 to 400 g/m$^2$, from 400 to 500 g/m$^2$, from 500 to 600 g/m$^2$, from 600 to 700 g/m$^2$, or from 700 to 730 g/m$^2$. For aircraft applications, preferred ranges include those from 0.005 to 0.01 psf (from 25 to 50 g/m$^2$), from 0.005 to 0.02 psf (from 25 to 100 g/m$^2$), from 0.005 to 0.03 psf (from 25 to 150 g/m$^2$), from 0.005 to 0.04 psf (from 25 to 200 g/m$^2$), from 0.005 to 0.05 psf (from 25 to 250 g/m$^2$), or from 0.005 to 0.06 psf (from 25 to 300 g/m$^2$), or some combination of two or more of these ranges.

As is the case with the thermoplastic substrate, the thermoset(ting) surfacing film is also a composite material, comprising one or more organic, inorganic, or metallic additives which are incorporated into the thermoset(ting) polymer or pre-polymer matrix, for example additives such as flow agent, rheology modifiers, density modifiers, preservatives, pigment, colorant, and the like. In certain embodiments, these additives include continuous or chopped fibers, whiskers, nanomaterials, particulate minerals, ceramics, impact modifiers, and/or filled or hollow capsules. The at least one particulate filler or additive may comprise nano-, micro-, and/or macro-dimensioned powders, particles, beads, flakes, whiskers, or fibers, wherein the at least one particulate filler or additive comprises a ceramic, polymer, glass, or metal/metalloid material or alloy thereof, or coated hybrid materials, for example including a carbide, nitride, or oxide of aluminum, boron, silicon, tin, zirconium, or aluminum, carbon, copper, nickel, Sn—Zn, or stainless steel, or aramid. These fillers may be distributed substantially uniformly throughout the thickness dimension of the surfacing film or may be concentrated toward one of the first or second surfaces thereof. These particulates fillers may comprise one or more of any of the functional materials described herein, e.g., ceramic, polymer, glass, or metal/metalloid material or alloy thereof.

Alternatively, or additionally, such a surfacing film may comprise one or more organic, inorganic, or metallic fibers, meshes, fabrics, or porous sheets contained within a thermoset(ting) resin.

Such fibers may serve as reinforcing fibers that include continuous or chopped fibers or whiskers of alumina, aramid, boron, carbon, glass, silicon carbide, or mixtures thereof. Glass and/or carbon fibers are particularly preferred.

The one or more organic or inorganic fibers, fabrics, weaves, meshes, or porous sheets may be contained within a thermoset(ting) resin or (pre)polymer, or may comprise one or more peelable organic or inorganic fabrics, weaves, meshes, or porous sheets disposed at or beneath the second surface of the thermoset(ting) surfacing film. The use of such peelable materials allows for subsequent removal of the peelable fabric, weave, mesh, or sheet from the second surface opposite the first surface the thermoset surfacing film to provide a fresh surface suitable for later painting. In certain embodiments of the present disclosure, the composite structure is one in which such a peelable layer has been removed, revealing such a paint-ready surface.

In further embodiments, the composite structure is one in which paint or other filled or unfilled or clear coat finish has been applied to this paint-ready surface; i.e., wherein the second surface of the thermoset surfacing film is so painted or coated. The choice of paint is not limiting, so long as the paint is compatible with the final surface composition. Preferred paints are those comprising a polyacrylate, a polyester, a polymethacrylate, a polyurethane, or a co-polymer or mixture thereof. The bonding of the paint to the exposed surface can be physical or chemical, or both, depending on the nature of the paint chosen. It is expected that the exposed surface will have a higher concentration of reactive chemical groups attached to the surface, resulting from the peeling process, than it would otherwise have had in the absence of the process described herein. As a result, it is also expected that the resulting bonding between the exposed surface and the paint will more likely to have a higher contribution of chemical interaction with the paint than it would have had without the process, thereby providing for a more integral bond.

As used herein, the term "fabric" refers to woven or non-woven material. The term "film" connotes a flat polymer section, consistent with its ordinary meaning. The fabric or film size may vary to include sheets, tapes, or continuous rolls. The film may be porous, semi-permeable, or non-porous. Non-porous perforated films are preferred. Both fabrics and films may include materials comprising a polyester, a polyamide, a polyethylene, a polypropylene, a polyethylenenaphthalate (PEN), a polyethylenterephthalate (PET), a polybutylenterephthalate (PBT), a polyether etherketone (PEEK), a polyamide, a polyaryletherketone (PAEK), a polyethersulfone (PES), a polyethylenenimine (PEI), a poly (p-phenylene sulfide) (PPS), a polyvinyl chloride (PVC), a fluorinated or perfluorinated polymer (such as a polytetrafluoroethylene (PTFE or Teflon®), a polyvinylidene difluoride (PVDF), a polyvinyl fluoride (PVF or Tedlar®)), or a mixture or copolymer thereof. Preferred exemplary fabrics may comprise a polyester, a polyamide, carbon fibers, glass or other inorganic fibers or Kevlar®. Polyesters, nylons, or mixtures thereof are especially useful as fabrics or films for this purpose. Each fabric or film may be coated or impregnated by laminating adhesive resin. The resin may be from 5 to 50% by weight or 10 to 40% by weight of the surfacing film composition. The polymer surface of either the fabrics or films may optionally be coated with silica, siloxane, aluminum oxide, or metal, or treated with plasma or silane.

The fabric or film may be single-ply or multi-ply fabric constructions. Where the fabric is woven, the woven fabric comprises tightly woven mono- or multi-filament tows. Tightly woven, high density weaves are preferred to provide a smooth finish, compatible with the finish desired for the final painted product. Accordingly, preferred weaves include a plain weave, a harness satin weave, a crow-foot satin weave, or a twill, with a crow-foot satin weave style being most preferred. Polymer films may be envisioned as the ultimate closed weave and calendared fabric, with polymer films providing a surface roughness which can be significantly less than even highly calendared, closed weave fabrics.

The tightness of the weave can be described in terms of warp ends and fill ends per inch, both terms being readily understood by those skilled in the art of woven fabrics. Fabrics or films of this invention comprise those which independently contain at least 80 warp ends per inch, or at least 100, 120, 140, or 160 warp ends per inch, and at least 40 fill ends per inch, or at least 60, 80, or 100 fill ends per inch. For example, good results are obtained wherein the fabrics or films contain at least about 80 warp ends per inch and at least about 40 fill ends per inch. More preferred embodiments include those weaves wherein the fabric is woven with at least 120 warp ends per inch and at least 60 fill ends per inch. Such weaves are commercially available, for example, from Precision Fabrics Group of Greensboro, North Carolina, and those characterized as providing "fine surface impressions" are most preferred. Exemplary compositions include 60004/56111 polyester, 51789/52006 nylon, and 52008/56115 nylon materials. Fiber or yarn thicknesses are such as to provide minimally open weaves, given the warp end/fill end parameters, and consistent with the thickness of the overall fabric.

Alternatively, or additionally, the thermoset(ting) surfacing film may comprise one or more sheet of a second functional material at least a portion of which is in the form of a porous woven or non-woven fabric, expanded metallic foil or polymer film, grating, mesh, screen, or web. In certain preferred embodiments, these porous sheets of additional functional materials are present in or on the surfacing film. As such, the surfacing film can optionally be mono-functional (e.g., also containing electrically conductive metal filaments or fibers) or multi-functional. Such additional materials include those electrically conductive materials, suitable to use in lightning strike protection, electric current dissipation, EMI shielding, or heat transfer applications.

That is, in some embodiments, these additional functional materials may be present as a plurality of sheets of functional materials or as a single sheet may comprise materials (including so-called hybrid materials) having multiple different functions. It is appreciated that the peelable porous sheets described above provide one functional capability (i.e., peelability), but in the context used here, the term "functional" refers to an attribute of the sheet material which imparts some character to the film that improves performance, e.g. impact stability, dimensional stability, electrical conductivity, and heat transfer capability, so as to provide improved strength, EMI shielding material, and static and lightning strike protection to a substrate to which it is ultimately attached. Further, the phrase "at least one sheet of a second functional material" can be one or more sheets of a non-peelable functional material, as to distinguish from the peelable fabric or sheet. That is, such second functional materials represent embodiments including (a) one sheet of one or more (non-peelable) functional materials, as described below; (b) two or more sheets of the same (non-peelable) functional material, (c) two or more sheets of different (non-peelable) materials, or (d) two or more sheets of two or more (non-peelable) functional materials.

Again, the porous sheets of the second functional materials may comprise woven fabrics and expanded films, but additionally these sheets may also comprise non-woven fabrics, meshes, screens, or webs of continuous or chopped organic or inorganic fibers, including the same or similar materials to those useful for the peelable porous sheets—i.e., one or more fluorinated or perfluorinated polymer (such as a polytetrafluoroethylene (PTFE or Teflon®), a polyvinylidene difluoride (PVDF), a polyvinyl fluoride (PVF or Tedlar®)), (meth)acrylate, (meth)acrylamides, polyester, polyamide, polyethylene, polypropylene, polyethylenenaphthalate (PEN), polyethylenterephthalate (PET), polybutylenterephthalate (PBT) polyether etherketone (PEEK), polyaryletherketone (PAEK), polyethersulfone (PES), polyethylenenimine (PEI), poly (p-phenylene sulfide), polyvinyl chloride, or a co-polymer or mixture thereof. Other useful organic materials include polyaniline, polypyrrole, polythiophene, or a copolymer or mixture thereof, either alone, or in mixtures with any of the other materials described for this purpose. Aramids (e.g., Kevlar® fibers) and imide fibers (e.g. Kapton®) are also attractive in this application. Since it is intended that the second functional materials will remain in the multifunctional surfacing film after curing and during ultimate use, the physical integrity or woven nature of these sheets is less critical than those of the peelable materials; i.e., they do not need to withstand a peeling operation.

The functional materials may also comprise ceramic or glass fibers—e.g., oxides, carbides, nitrides, oxycarbides, oxynitrides, carbonitrides, or oxycarbonitrides comprising aluminum, boron, silicon, and/or titanium—cermet fibers, carbon, or metallic fibers—e.g., comprising aluminum, copper, iron, silver, tin, or zinc, or mixtures, alloys—or coated hybrids comprising these materials. Exemplary materials include fibers or whiskers of alumina, aramid, boron, carbon, glass, silicon carbide, aluminum nitride, coated hybrids or mixtures thereof, preferably glass, carbon or metal-coated fibers. As used herein, the term "fibers" includes those of macro, micro, or nanodimensions, and include wires through elongated single crystals also known as whiskers. In some cases, these materials are composites of the various material classes, for example, including carbon coated metals, glass, or polymers; metal coated polymers, carbon, or glass; polymer coated glass, carbon, or metals, etc. In some cases, the functional materials are electrically conductive. In some embodiments, the functional materials impart a magnetic character to the surfacing film.

In specific embodiments within this more general description, the composite structure comprises an adhered thermoset(ting) surfacing film that is a multi-functional solid-form composite material comprising two or more of (a) a first peelable fabric, weave, mesh, or porous sheet disposed at or beneath the second surface;

(b) at least one electrically conductive material, suitable to use in lightning strike protection, electric current dissipation, EMI shielding, or heat transfer applications;

(c) at least one particulate filler or additive comprising nano-, micro-, and/or macro-dimensioned powders, particles, beads, flakes, whiskers, or fibers, wherein the wherein the at least one particulate filler or additive comprises a ceramic, polymer, glass, or metal/metalloid material or alloy thereof, for example including a carbide, nitride, or oxide of aluminum, boron, silicon, tin, zirconium, or aluminum, carbon, copper, nickel, Sn—Zn, or stainless steel, or aramid; and optionally (d) a UV resistant polymer or UV stabilizing additive, as are known in the art.

Physical Characteristics of the Composite Structures

The composite structures disclosed herein may also be characterized by one or more of their physical attributes, for example, by the strength of the direct bonding of the thermoplastic and thermoset(ting) materials.

In certain embodiments, the thermoset surfacing film is adhered to the thermoplastic substrate at a strength sufficient to score at least a 3B, 4B, or 5B for a 45° cross-hatched tape test according to ASTM D3359-09, the conditions of which are described more fully in the Examples.

Methods of Making

To this point, this disclosure has described the composite structures, but the disclosure also embraces the methods of making these structures. Alternative embodiments include those structures derived or derivable from the following methods, even if different than described in terms of specifically disclosed composite structures.

As described herein, the present disclosure includes those methods of preparing a direct-bonded thermoplastic-thermoset(ting) composite, the method comprising:

(a) irradiating a surface of a thermoplastic substrate with actinic radiation sufficient to activate the surface of the thermoplastic substrate;

(b) contacting a thermosetting or thermosettable surfacing film to the activated thermoplastic substrate surface; and (c) applying pressure, and optionally heat, to the thermosetting or thermosettable surfacing film against the thermoplastic substrate for a time and under conditions sufficient to form a direct bond between the thermoplastic substrate and the thermosetting or thermosettable surfacing film.

In certain embodiments, these methods further comprise curing the thermosetting or thermosettable surfacing film thereby forming a composite structure comprising a thermoplastic substrate directly bonded to a thermoset(ting) surfacing film.

These embodiments include those methods employing any of the thermoplastic substrates and surfacing films described elsewhere herein.

These embodiments also include the use of actinic radiation as described elsewhere herein. For the sake of completeness, these are reiterated here, in part, as including wherein the actinic radiation is applied at an intensity sufficient at one or more wavelengths in a range of from about 10 nm to about 450 nm, preferably in a range of from about 200 nm to about 350 nm. Suitable sub-ranges are described elsewhere herein. Similarly, the actinic radiation may be applied at one or more wavelengths at an energy in a range from about 0.1 J/cm$^2$ to about 300 J/cm$^2$ at the at least one wavelength preferably in the range from about 0.5 J/cm$^2$ to about 250 J/cm$^2$, or from about 1.5 J/cm$^2$ to about 250 J/cm$^2$ at the at least one wavelength, or any one or more of the additional embodied ranges set forth herein.

Further, the actinic radiation may be applied at a rate in one or more ranges of from about 2 mW/cm$^2$ to about 3000 mW/cm$^2$, from about 2 mW/cm$^2$ to about 2000 mW/cm$^2$, from about 300 mW/cm$^2$ to about 600 mW/cm$^2$, or preferably from about 40 to 500 mW/cm$^2$ for times ranging from about 2 to about 600 sec or from about 10 to about 60 sec. In certain other embodiments, the actinic radiation may be applied at one or more wavelengths at a rate described by one or more ranges of from about 2 to about 5 mW/cm$^2$, from about 5 to about 10 mW/cm$^2$, from about 10 to about 25 mW/cm$^2$, from about 25 to about 50 mW/cm$^2$, from about 50 to about 100 mW/cm$^2$, from about 100 to about 200 mW/cm$^2$, from about 200 to about 300 mW/cm$^2$, from about 300 to about 400 mW/cm$^2$, from about 400 to about 500 mW/cm$^2$, from about 500 to about 600 mW/cm$^2$, from about 600 to about 700 mW/cm$^2$, from about 700 to about 800 mW/cm$^2$, from about 800 to about 900 mW/cm$^2$ from about 900 to about 1000 mW/cm$^2$, from about 1000 to about 2000 mW/cm$^2$, from about 2000 to about 3000 mW/cm$^2$. In some embodiments, the range is from about 2 to 2000 mW/cm$^2$, or preferably from about 40 to 500 mW/cm$^2$.

It will be appreciated that the time needed to deliver these energies depends on the nature of the substrates and the rate at which the energy is delivered to the substrate. Faster activation may be desirable for a continuously moving production line, for example where successive substrates are passed by a light source to activate them. The duration of the exposure may be from about 0.1 seconds to about 360 minutes, such as from about 0.5 seconds to about 180 minutes or from about 0.5 seconds to about 30 minutes or from about 3 seconds to about 19 minutes or less than about 240 seconds. From the vantage of throughput, it is preferred that the duration of the exposure is from about 0.1 seconds to about 360 minutes.

Additionally, or alternatively, the actinic radiation may be applied at one or more wavelengths at one or more of the preceding rates for a time defined by one or more ranges of from about 2 to about 5 sec, from about 5 to about 10 sec, from about 10 to about 20 sec, from about 20 to about 30 sec, from about 30 to about 40 sec, from about 40 to about 60 sec, from about 60 to about 80 sec, from about 80 to about 100 sec, from about 100 to about 200 sec, from about 200 to about 300 sec, from about 300 to about 400 sec, from about 400 to about 500 sec, from about 500 to about 600 sec, or even longer to about 20 minutes, to about 60 minutes, or to about 360 minutes.

The energy required to prepare any individual thermoplastic-thermoset bonding pair depends on the nature of the materials being bonded and the time available for such actinic activation. Good results have been achieved, and are believed to be generally available after treatments using treatments of:

UV-$A$(320-390 nm)–200 mW/cm$^2$×30 sec=6000 mJ/cm$^2$=6 J/cm$^2$

UV-$B$(280-320 nm)–306 mW/cm$^2$×30 sec=9180 mJ/cm$^2$=9.2 J/cm$^2$

UV-$C$(100-260 nm)–70 mW/cm$^2$×30 sec=2100 mJ/cm$^2$=2.1 J/cm$^2$

UV-$V$(395-445 nm)–200 mW/cm$^2$×30 sec=6 J/cm$^2$ suggesting that ranges of the following are suitable, either individually or collectively, at least for the materials tested, if not more generally:

UV-$A$(320-390 nm)–100-400 mW/cm$^2$×10-120 sec=1 to 48 J/cm$^2$

UV-$B$(280-320 nm)–10-300 mW/cm$^2$×10-120 sec=0.1 to 36 J/cm$^2$

UV-$C$(100-260 nm)–5-200 mW/cm$^2$×10-120 sec=0.5 to 24 J/cm$^2$

UV-$V$(395-445 nm)–50-400 mW/cm$^2$×10-120 sec=0.5 to 48 J/cm$^2$

The irradiation using each of these ranges independently is considered an independent embodiment.

In all aspects of the invention where actinic radiation is referred to the actinic radiation is from a light source intentionally and/or specifically arranged to irradiate the substrate to be bonded. In some examples, the source is within 1 meter of the substrate, for example within 30 cm thereof. To be clear, the irradiation by the actinic radiation from such a light source is not intended to include, and in some embodiments specifically excludes, the use of ambient light such as natural light, light from overhead lights etc.

The methods described herein do not require the incorporation of an activator within the thermoplastic substrate. Nor do these methods require any of treatments that otherwise create a physical change to the surface which facilitates better adhesion such as chemical etching (e.g., acid etching), or physical abrasion (e.g., sand/grit blasting) or other treatment (e.g., flame treatment; plasma treatment; ozone treatment etc.).

Unless otherwise stated, the surface of a thermoplastic substrate is irradiated in otherwise ambient temperatures and conditions, but in some embodiments, the irradiating is done at super-ambient temperatures (e.g., in one or more ranges of from 20° C. to 25° C., from 25° C. to 30° C., from 30° C. to 40° C., from 40° C. to 50° C., or from 50° C. to 60° C.). Additionally, or alternatively, in separate embodiments, the irradiating may be done in the absence of oxygen, in vacuum conditions, in ambient air, or in oxygen-rich environments.

The irradiating may be done either over the entire surface of the thermoplastic substrate or over a patterned section. For example, the exposing of the surface to actinic radiation is applied selectively to create areas of the surface that are activated for subsequent bonding and areas of the surface that are not activated for subsequent bonding. A mask may be used which has areas which transmit actinic radiation to create areas of the surface that are activated for subsequent bonding areas and areas which block actinic radiation to create areas of the surface that are not activated for subsequent bonding. Small areas or large areas can be treated with different equipment (spot radiation source(s) to a large array of radiation sources) depending on need. Only the area to be bonded need be exposed to the radiation. If done in a patterned or spotted manner, the surfacing film will adhere substantially only to those activated sections, or substantially more than to non-activated sections.

Without intending to be bound by the correctness of any particular theory, it is possible that the actinic irradiation activates the thermoplastic surface by rupturing at least some of these heteroatom linkages, thereby providing activated pendant —OH, —SH, —C(O)H, —C(O)OH, or —C(O)—NH moieties, that when presented with reactive groups in the surfacing films form cross-polymer linkages.

Once the thermoplastic surface is activated, the thermoset (ting) surfacing film is applied with pressure and optionally heat. In certain embodiments, the pressure applied is one or more pressures in a range of from about 0.05 MPa to 1.2 MPa, or in one or more ranges of from 0.05 MPa to 0.1 MPa, from 0.1 MPa to 0.2 MPa, from 0.2 MPa to 0.3 MPa, from 0.3 MPa to 0.4 MPa, from 0.4 MPa to 0.5 MPa, from 0.5 MPa to 0.6 MPa, from 0.6 MPa to 0.7 MPa, from 0.7 MPa to 0.8 MPa, from 0.8 MPa to 0.9 MPa, from 0.9 MPa to 1.0 MPa, from 1.0 MPa to 1.1 MPa, from 1.1 MPa to 1.2 MPa, or a combination of two or more of the foregoing ranges, for example from 0.4 MPa to 0.8 MPa, or from 0.6 MPa to 0.7 MPa. The pressures may be applied for times ranging from 30 min to 60 min, from 60 min to 90 min, from 90 min to 120 min, from 120 min to 180 min, from 180 min to 240 min, or longer. In certain embodiments, the composite structure of the thermoplastic substrate and the thermoset (ting) surfacing film are heated during this pressure treatment. In other embodiments, no external heat is applied, but when applied, the temperature of the structure is heated to one or more temperatures in a range of from 150° C. to 160° C., from 160° C. to 170° C., from 170° C. to 180° C., from 180° C. to 190° C., from 190° C. to 200° C., for example from 170° C. to 180° C. In independent embodiments, the heat is applied for some or all of the times described, either statically or at a ramping rate, such as described in the Examples.

Once bonded, the bond-strength between the thermoplastic substrate and the thermoset surfacing film is consistent with the bonding metrics described elsewhere herein.

Articles Incorporating these Composite Structures

In addition to the composite structures and the methods of making them, the present disclosure contemplates all articles comprising these composite structures. The composite structures are suited for articles of any size but are especially attractive for large structures. Structures contemplated include those which may be one of more of any of a primary structure element, secondary structure element, exterior element, interior element and parts forming those elements in commercial and personal aircraft and aerospace applications, motor vehicles, watercraft (including ships), railroad cars and tankers and storage tanks That is, those aircraft components comprising any of the composite structure described herein are considered within the scope of the present disclosure. These include, but are not limited to aircraft tails, wings, fuselages, or propellers, and corresponding features of other winged or wingless air or space vehicles.

Further, those components of land-based vehicles, such as automobiles, bicycles, motorcycles, trucks, or watercraft comprising any composite structure described herein are also considered within the scope of the present disclosure. These include, but are not limited to hoods, fenders, bumpers, hulls, or frames.

Terms

In the present disclosure the singular forms "a," "an," and "the" include the plural reference, and reference to a numerical value includes at least that value, unless the context clearly indicates otherwise. Thus, for example, a reference to "a material" is a reference to at least one of such materials and equivalents thereof known to those skilled in the art, and so forth.

When a value is expressed as an approximation by use of the descriptor "about," it will be understood that the value forms another embodiment. In general, use of the term "about" indicates approximations that can vary depending on the desired properties sought to be obtained by the disclosed subject matter and is to be interpreted in the specific context in which it is used, based on its function. The person skilled in the art will be able to interpret this as a matter of routine. In some cases, the number of significant figures used for a value may be one non-limiting method of determining the extent of the word "about." In other cases, the gradations used in a series of values may be used to determine the intended range available to the term "about" for each value. Where present, all ranges are inclusive and combinable. That is, references to values stated in ranges include every value within that range.

It is to be appreciated that certain features of the disclosure which are, for clarity, described herein in the context of separate embodiments, may also be provided in combination in a single embodiment. That is, unless obviously incompatible or specifically excluded, each individual embodiment is deemed to be combinable with any other embodiment(s) and such a combination is another embodiment. Conversely, various features of the disclosure that are, for brevity, described in the context of a single embodiment, may also be provided separately or in any sub-combination. Finally, while an embodiment may be described as part of a series of steps or part of a more general structure, each said step may also be considered an independent embodiment, combinable with others.

The transitional terms "comprising," "consisting essentially of," and "consisting" are intended to connote their generally in accepted meanings in the patent vernacular; that is, (i) "comprising," which is synonymous with "including," "containing," or "characterized by," is inclusive or open-ended and does not exclude additional, unrecited elements or method steps; (ii) "consisting of" excludes any element, step, or ingredient not specified in the claim; and (iii) "consisting essentially of" limits the scope of a claim to the specified materials or steps "and those that do not materially affect the basic and novel characteristic(s)" of the claimed invention. Embodiments described in terms of the phrase "comprising" (or its equivalents), also provide, as embodiments, those which are independently described in terms of "consisting of" and "consisting essentially of" For those embodiments provided in terms of "consisting essentially of," the basic and novel characteristic(s) is the facile operability of the methods or compositions/systems to provide the composite structures described herein or associated with the specific composition or method step.

When a list is presented, unless stated otherwise, it is to be understood that each individual element of that list, and every combination of that list, is a separate embodiment. For example, a list of embodiments presented as "A, B, or C" is to be interpreted as including the embodiments, "A," "B," "C," "A or B," "A or C," "B or C," or "A, B, or C," as separate embodiments, as well as $C_{1-3}$.

Use of parentheticals or brackets to describe materials, such as (meth)acrylic or [meth]acrylic or (pre)polymers, is intended to connote the absence or presence of the parenthetical or bracketed term or phrase. The term "(meth)acrylic," for example, refers to one or both of acrylic and methacrylic. The term "(pre)polymer," then, refers to one or both of polymer or prepolymer (the latter comprising monomers or oligomers, or even non-crosslinked polymers, depending on the nature of the organic components).

Throughout this specification, words are to be afforded their normal meaning, as would be understood by those skilled in the relevant art. However, to avoid misunderstanding, the meanings of certain terms will be specifically defined or clarified.

The term "actinic radiation" refers to a wavelength of electromagnetic radiation that can produce a photochemical reaction, including the ability of incident actinic irradiation to activate a thermoplastic composition or surface. In various embodiments of the present disclosure, in addition to the specific ranges recited elsewhere herein, the term "actinic radiation" also includes light or radiation with at least one wavelength characterized as UV-A (about 315-400 nm, or 320-390 nm) and UV-B (280-315 nm, or 280-320 nm). In other embodiments, the actinic radiation includes light or radiation with at least one wavelength characterized as UV-C (about 100-280 nm), UV-V (395-445 nm), near ultraviolet (NUV; 300-400 nm), middle ultraviolet (MUV; 200-300 nm), far ultraviolet (FUV; 122-200 nm), vacuum ultraviolet (VUV; 10-200 nm), or extreme ultraviolet (EUV; 10-120 nm).

In the context of the present disclosure, the term "composite structure" refers to the layered structure arising from the direct bonding between the thermoplastic substrate and the thermoset(ting) surfacing film. Recognizing that both the thermoplastic substrates and the thermoset(ting) surfacing films themselves both also may be considered composites in the true sense of that term—i.e., a polymer or prepolymer matrix comprising additives, fillers, fibers, etc.—these are referred to herein as either composite thermoplastic substrates or composite surfacing films, if the term "composite" is used as all in these contexts.

The term "cured," as is conventionally understood, refers to a chemical process that produces the toughening or hardening of a polymer material by cross-linking of polymer chains. It is strongly associated with the production of thermoset(ting) polymers. Curing can be affected by heat, radiation, electron beams, or chemical additives. As used herein, the term "partially cured" refers to any increase in degree of crosslinking, relative to that of the original polymer or prepolymer material.

"Optional" or "optionally" means that the subsequently described circumstance may or may not occur, so that the description includes instances where the circumstance occurs and instances where it does not.

The terms "method(s)" and "process(es)" are considered interchangeable within this disclosure.

The terms "photolysis," "photolytic," or the like refers to a controlled activation of the thermoplastic surface by the used of UV light, during which certain chemical bonds are broken, typically chemical bonds comprising heteroatoms, thereby generating functional groups that renders the surface more chemically active than the untreated surface. These more chemically active functional groups can or do bond with the thermosetting surfacing film during the cure of the surfacing film.

The term "resin" as used herein carries its conventional meaning of a liquid, typically viscous or highly viscous material, that convert to solid materials on curing.

The term "surfacing film" is one well known in the art of aerospace engineering as referring to solid form composite materials, typically having an areal weight of less than 0.150 pound per square foot and a total thickness in a range of from 25 to 12,500 microns (1 to 500 mils). They are typically applied to aircraft substrate surfaces to provide surface qualities required for aerospace applications. In certain embodiments, reference to a surfacing film connotes such a composite material in one or more organic, inorganic, or metallic additives which are incorporated into a polymer or pre-polymer matrix, for example additives such as flow agent, rheology modifiers, density modifiers, preservatives, pigment, colorant, and the like. In other embodiments, the surfacing film may additionally or alternatively comprise one or more organic, inorganic, or metallic fibers, meshes, fabrics, or porous sheets contained within a thermoset(ting) resin. In an epoxy-based thermoset(ting) surfacing film, the thermoset(ting) resin comprises an epoxy-based resin. The surfacing film can optionally be mono-functional (e.g., containing electrically conductive metal filaments or fibers) or multi-functional (as in our previous applications).]

The term "thermoplastic" as used herein is a plastic polymer material that becomes pliable or moldable at a certain elevated temperature and solidifies upon cooling. The thermoplastics considered within this disclosure, such as are used in aerospace applications typically undergo such transformations at elevated temperatures. Specific types of materials embraced by this label are disclosed elsewhere herein and include, but are not limited to polymers of (meth)acrylics, acrylonitrile (including acrylonitrile butadiene styrene), ethylene vinyl alcohol (EVOH), ethylene-vinyl acetate (EVA), polyamides, polyamide-imide (PAI), polyaryletherketone (PAEK), polybenzimidazole, polycarbonate, polylactic acid (polylactide), polyether sulfone, polyoxymethylene (also known as acetal), polyetherether ketone, polyetherimide, polyetheretherketone (PEEK), polyetherimide (PEI), polyetherketoneketone (PEKK), polyethersulfone (PES), polyethylene, polyhydroxyalkanoates polyimide, polyketone, polyphenylene oxide, polyphenylene sulfide, polysulfone, polypropylene, polystyrene, polytetrafluoroethylene, polyurethane, polyvinyl chloride, and polyvinylidene fluoride.

The terms "thermosetting" or "thermosettable" are used herein in their conventional sense to refer to polymers or prepolymers or resins that become or are irreversibly hardened (i.e., "thermoset") by cross-linking networks during curing. Crosslinked (meth)acrylics, (meth)acrylamides, benzoxazines, a bismaleimides, epoxies, polyamides, polyimides, polyurethanes, vinyl esters, phenolic, amino and furan resins, or copolymers or mixtures thereof are non-limiting examples of these types of materials.

As convention in the industry, either of the terms "thermoset" or "thermoset(ting)" may be used broadly to describe the nature of the polymer or surfacing film, regardless of the degree of cure. The term "thermoset(ting)" embraces both partially or fully cured (thermoset) and uncured or lesser cured (thermosetting or thermosettable) materials. Clearly, the degree of curing is a spectrum for any material, but a person of skill in the art would be able to distinguish the meaning of these terms in the context of their use.

A "thermosetting or thermosettable surfacing film" or "thermoset(ting) film" a solid-form composite material, comprising the respectively cited polymer or prepolymer. Such surfacing films comprise polymers and/or prepolymers and one or more organic, inorganic, or metallic additives which are incorporated into a polymer or pre-polymer matrix, for example additives such as flow agent, rheology modifiers, density modifiers, preservatives, pigment, colorant, and the like. These surfacing films may also optionally comprise one or more organic, inorganic, or metallic fibers, meshes, fabrics, or porous sheets contained within or on one surface of the polymer or pre-polymer matrix. In an epoxy-based thermoset surfacing film, the thermoset resin comprises an epoxy-based resin. The surfacing film can optionally be mono-functional (e.g., containing electrically conductive metal filaments or fibers) or multi-functional (as described elsewhere herein). It is to be understood that the terms "thermosetting or thermosettable surfacing film" and "thermoset surfacing film" refer to a surfacing film composition with different degrees of curing. For the sake of clarity, it should be appreciated that these terms should be considered in the context in which they arise.

The following listing of Embodiments is intended to complement, rather than displace or supersede, the previous descriptions.

Embodiment 1. A composite structure comprising a thermoplastic substrate directly bonded to a thermoset(ting) surfacing film;

wherein the direct bonding defines an interface between a thermoplastic surface of the thermoplastic substrate and a first surface of the thermoset(ting) surfacing film, the thermoset(ting) surfacing film further comprising a second surface opposite the first surface of the thermoset(ting) surfacing film.

Unless otherwise specified, the thermoplastic surface is the same as or chemically consistent with the thermoplastic substrate, where the term "chemically consistent with" means that the polymer building blocks of the substrate and surface are the same, even if some of the bonding sites of the surfaces have been altered by photolytic activation.

Embodiment 2. The composite structure of Embodiment 1, wherein the thermoplastic substrate independently comprises:

(a) polyaryletherketone such as polyether ether ketone (PEEK) polyether ketone ketone (PEKK), polyether ketone (PEK); polyether ether ketone ketone (PEEKK); or polyether ketone ether ketone ketone (PEKEKK);

(b) a polymer containing a phenyl group directly attached to a carbonyl group, optionally wherein the carbonyl group is part of an amide group, such as polyarylamide (PARA);

(c) a polyphenylene sulfide (PPS);

(d) a polyphenylene oxide (PPO); or (e) a polyetherimide (PEI).

Embodiment 3. The composite structure of Embodiment 1 or 2, wherein the thermoplastic substrate comprises a thermoplastic polymer whose linkages are susceptible to at least partial photolytic cleavage upon irradiation by actinic radiation of sufficient intensity wherein the actinic radiation includes radiation with at least one wavelength in the range from about 10 nm to about 500 nm or about 100 nm to about 450 nm, preferably in a range of from about 200 nm to about 350 nm. Additional Aspects of this Embodiment include the sub-ranges of these ranges described elsewhere herein.

Embodiment 4. The composite structure of any one of Embodiments 1 to 3, wherein the thermoplastic substrate comprises a thermoplastic polymer whose linkages are susceptible to at least partial photolytic cleavage upon irradiation by at least one wavelength (optionally 1, 2, 3, or 4 wavelengths) of actinic radiation at an energy in a range from about 0.1 J/cm$^2$ to about 300 J/cm$^2$ at the at least one wavelength preferably in the range from about 0.5 J/cm$^2$ to about 250 J/cm$^2$, or from about 1.5 J/cm$^2$ to about 250 J/cm$^2$ at the at least one wavelength. Additional Aspects of this Embodiment include the sub-ranges of these ranges described elsewhere herein.

Embodiment 5. The composite structure of any one of Embodiments 1 to 4, wherein the thermoset(ting) surfacing film is directly bonded to a patterned portion of the thermoplastic surface.

Embodiment 6. The composite structure of any one of Embodiments 1 to 5, wherein the thermoset(ting) surfacing film is uncured Embodiment 7. The composite structure of any one of Embodiments 1 to 6, wherein the thermoset(ting) surfacing film is partially cured.

Embodiment 8. The composite structure of any one of Embodiments 1 to 7, wherein the thermoset(ting) surfacing film is an epoxy-based thermoset(ting) surfacing film.

Embodiment 9. The composite structure of any one of Embodiments 1 to 8, wherein the thermoset(ting) surfacing film is itself a solid-form composite material comprising one or more organic or inorganic fibers, fabrics, weaves, meshes, or porous sheets contained within a thermoset(ting) resin.

Embodiment 10. The composite structure of any one of Embodiments 1 to 9, wherein the thermoset(ting) surfacing film is a solid-form composite material comprising one or more peelable organic or inorganic fabrics, weaves, meshes, or porous sheets disposed at or beneath the second surface of the thermoset(ting) surfacing film.

Embodiment 11. The composite structure of any one of Embodiments 1 to 10, wherein the thermoset(ting) surfacing film is a solid-form composite material comprising one or more organic or inorganic fabrics, weaves, meshes, or porous sheets contained within a thermoset(ting) resin, and further comprises at least one electrically conductive material, suitable to use in lightning strike protection, electric current dissipation, EMI shielding, or heat transfer applications.

Embodiment 12. The composite structure of any one of Embodiments 1 to 11, wherein the epoxy-based thermoset(ting) surfacing film is a solid-form composite material comprising one or more organic or inorganic fabrics, weaves, meshes, or porous sheets, and further comprises at least one particulate material suitable to use as an impact modifier contained within a thermoset(ting) resin.

Embodiment 13. The composite structure of any one of Embodiments 1 to 12, wherein the thermoset(ting) surfacing film is a multi-functional solid-form composite material comprising two or more of
(a) a first peelable fabric, weave, mesh, or porous sheet disposed at or beneath the second surface;
(b) at least one electrically conductive material, suitable to use in lightning strike protection, electric current dissipation, EMI shielding, or heat transfer applications;
(c) at least one particulate filler or additive comprising nano-, micro-, and/or macro-dimensioned powders, particles, beads, flakes, whiskers, or fibers, wherein the at least one particulate filler or additive comprises a ceramic, polymer, glass, or metal/metalloid material or alloy thereof, for example including a carbide, nitride, or oxide of aluminum, boron, silicon, tin, zirconium, or aluminum, carbon, copper, nickel, Sn—Zn, or stainless steel, or aramid;
(d) a UV resistant polymer or a UV stabilizing additive.

Embodiment 14. The composite structure of any one of Embodiments 1 to 13, wherein the thermoset(ting) surfacing film has an areal weight of less than 0.150 pound per square foot.

Embodiment 15. The composite structure of any one of Embodiments 1 to 14, wherein the thermoset(ting) surfacing film has a total thickness in a range of from 25 to 12,500 microns (1 to 500 mils). Additional Aspects of this Embodiment include the sub-ranges of these ranges described elsewhere herein.

Embodiment 16. The composite structure of any one of Embodiments 1 to 15, wherein the thermoset(ting) surfacing film is adhered to the thermoplastic substrate directly bonded to a thermoset surfacing film at a strength sufficient score at least a 3B, 4B, or 5B for a 45° cross-hatched tape test according to ASTM D3359-09 (the conditions of which are described more fully in the Examples).

Embodiment 17. A method of preparing a direct-bonded thermoplastic-thermoset(ting) composite, the method comprising:
(a) irradiating a surface of a thermoplastic substrate with actinic radiation sufficient to activate the surface of the thermoplastic substrate;
(b) contacting a thermosetting or thermosettable surfacing film to the activated thermoplastic substrate surface; and
(c) applying pressure, and optionally heat, to the thermosetting or thermosettable surfacing film against the thermoplastic substrate for a time and under conditions sufficient to form a direct bond between the thermoplastic substrate and the thermosetting or thermosettable surfacing film.

In certain independent Aspects of this Embodiment, the irradiating is done at ambient or super-ambient temperatures and conditions, in the absence of oxygen, under vacuum conditions, in ambient air, or in oxygen-rich environments, as set forth elsewhere herein.

Embodiment 18. The method of Embodiment 17, further comprising curing the thermosetting or thermosettable surfacing film thereby forming a composite structure comprising a thermoplastic substrate directly bonded to a thermoset surfacing film.

Embodiment 19. The method of Embodiments 17 or 18, wherein the thermoplastic substrate comprises:
(a) polyaryletherketone such as polyether ether ketone (PEEK) polyether ketone ketone (PEKK), polyether ketone (PEK); polyether ether ketone ketone (PEEKK); or polyether ketone ether ketone ketone (PEKEKK);
(b) a polymer containing a phenyl group directly attached to a carbonyl group, optionally wherein the carbonyl group is part of an amide group, such as polyarylamide (PARA);
(c) a polyphenylene sulfide (PPS);
(d) a polyphenylene oxide (PPO); or
(e) a polyetherimide (PEI).

Embodiment 20. The method of any one of Embodiments 17 to 19, wherein the thermosetting or thermosettable surfacing film surfacing film is an epoxy-based thermosetting or thermosettable surfacing film surfacing film, and the corresponding thermoset surfacing film is an epoxy-based thermoset surfacing film.

Embodiment 21. The method of any one of Embodiments 17 to 20, wherein the actinic radiation is applied at an intensity sufficient at one or more wavelengths in a range of from about 10 nm to about 450 nm, preferably in a range of from about 200 nm to about 350 nm. Additional Aspects of this Embodiment include the sub-ranges of these ranges described elsewhere herein.

Embodiment 22. The method of any one of Embodiments 17 to 21, wherein the actinic radiation is applied at one or more wavelengths at an energy in a range from about 0.1 J/cm² to about 300 J/cm² at the at least one wavelength preferably in the range from about 0.5 J/cm² to about 250 J/cm², or from about 1.5 J/cm² to about 250 J/cm² at the at least one wavelength. Additional Aspects of this Embodiment include the sub-ranges of these ranges described elsewhere herein. Similarly, additional Aspects of this Embodiment include those rates and times of the application of the actinic radiation described and set forth elsewhere herein.

Embodiment 23. The method of any one of Embodiments 17 to 22, wherein pressure applied to the thermoset(ting) surfacing film is 0.1 to 1 MPa at one or more elevated temperature, for example at 160° C. to 180° C., for a time in a range of from about 30 minutes to about 240 minutes.

Embodiment 24. The method of any one of Embodiments 17 to 23, wherein the direct-bonded thermoplastic-thermoset composite exhibits a bond-strength between the thermoplastic substrate and the thermoset surfacing film to exhibit a score of at least a 3B, 4B, or 5B for a 45° cross-hatched tape test according to ASTM D3359-09.

Embodiment 25. A composite structure prepared by any one of Embodiments 17 to 24.

Embodiment 26. An aircraft component comprising a composite structure of any one of Embodiments 1 to 16. In certain Aspects of this Embodiment, the aircraft component comprises an aircraft tail, wing, fuselage, or propeller.

Embodiment 27. A component or part of a land-based vehicle, such as automobiles, bicycles, motorcycles, trucks, or watercraft comprising a composite structure of any one of Embodiments 1 to 16. In certain Aspects of this Embodiment, the component comprises a hood, fender, bumper, hull, or frame.

EXAMPLES

Standard Application Conditions

Under standard conditions, the surface of a thermoplastic substrate was cleaned using an isopropanol wipe to remove dust. Once cleaned, and where so indicated, the surface of the thermoplastic substrate was irradiated with UV light using a UVALOC 1000 source, fitted with a Mercury D-type bulb (iron doped) for the prescribed time and energy, after which the surfacing film was overlaid on the thermoplastic surface, and the assembly was consolidated with a standard vacuum bag/autoclave process according to the following steps:

(1) An aluminum caul plate was wiped and cleaned by acetone and then a releasing agent was applied on the plate except the edges;

(2) the border of the plate was lined with vacuum putty;

(3) the parts/specimens were first laid up in advance where the one side tacky (OST) surfacing film was laid up on the thermoplastic substrate from its tacky side to make the specimens. Then the specimens were placed inside the border of the caul plate by using arrangements of film material (nylon film), the specimen, perforated Teflon film, and breather cloth.

(4) A vacuum line vent was placed on the plate and the entire assembly was covered with nylon film. The nylon film was pressed into putty to form a tight seal. Vacuum was drawn to test the quality of the seal;

(5) The whole bagged plate was put inside the autoclave;

(6) The specimens were cured under the following conditions: Temperature: 177° C. with a ramping rate of 1.7° C./min, Pressure 0.31 MPa, Time: 120 minutes.

After this consolidation, the assembly was removed, visually inspected, and the adhesion tested.

Standard Testing Conditions

The adhesion performance was evaluated with the cross-hatch test method where the test was done as follow:

(1) The specimen was scribed with a cutting tool according to FIG. 1 where cutting was done through the coating (surfacing film) to the base material. The cutting tool can be a sharp razor blade, scalpel, or knife. In this test, 45-degree crosshatch scribe was made where the angle between two sets of parallel scribes was 45±5 degrees and the parallel scribes are apart by about 3.05 mm.

(2) The masking tape (3M tape No. 250) was applied as illustrated in FIG. 1. The tape was press down firmly by using the roll of tape itself.

(3) After 1 minute of applying the tape on the panels, the tape was removed in one abrupt motion and pulling perpendicular to the panel.

(4) The tested area was visually examined and rated according to ASTM D3359-09. The cross-hatch rating ranges from OB to 5B where OB is the worst condition with an area removed percentage of greater than 65%. The rating classification is summarized in Table 1.

TABLE 1

| Classification of adhesion test results | |
| --- | --- |
| Rating | Percent Area Removed |
| 5 B | 0% (none removed) |
| 4 B | Less than 5% |
| 3 B | 5 to 15% |
| 2 B | 15 to 35% |
| 1 B | 35 to 65% |
| 0 B | Greater than 65% |

Materials:

Thermoplastic substrate: The thermoplastic substrate used in these Examples was a thermoplastic consolidated laminate (TPCL) made of several layers of thermoplastic powdered woven fabric. The powdered woven fabric comprised a high tenacity carbon fiber (Tenax-E HTA40 E13 3K 200 tex) and a PEEK matrix (42 wt. %). The fabric had a 5 Harness pattern with an areal weight of 285 g/m² and a total panel thickness of 1.5 mm.

Surfacing film: The surfacing film used in these Examples was a dual cure option (120-177° C.) epoxy-based composite surfacing film and curable in non-autoclave conditions (in vacuum bag with low vacuum pressure of 0.07 MPa) or in autoclave (with higher pressure of 0.31 MPa). The surfacing film contained a non-woven (polyester or carbon) fabric and had a total areal weight of 146 g/m².

Lightning strike surfacing film: This film was also a dual cure option (120-177° C.) epoxy-based composite surfacing film and curable in non-autoclave conditions (in vacuum bag with low vacuum pressure of 0.07 MPa) or in autoclave (with higher pressure of 0.31 MPa). The lightning strike film further contained expanded copper foil (in addition to non-woven polyester/carbon fabric). The areal weight of the epoxy resin was 122 g/m² and the areal weight of the copper foil was 70 g/m².

Peel and Paint surfacing film: This film was also a dual cure option (120-177° C.) epoxy-based composite surfacing film and curable in non-autoclave conditions (in vacuum bag with low vacuum pressure of 0.07 MPa) or in autoclave (with higher pressure of 0.31 MPa) without any polyester/carbon non-woven fabric. The film contained a nylon peel ply fabric with plain weave pattern and an areal weight of 59 g/m². The final areal weight of the film after cure and peeling off the peel ply was about 78 g/m².

Peel and Paint lightning strike film: This film was also a dual cure option (120-177° C.) epoxy-based composite surfacing film and curable in non-autoclave conditions (in vacuum bag with low vacuum pressure of 0.07 MPa) or in autoclave (with higher pressure of 0.31 MPa) without any polyester/carbon non-woven fabric. The film contained expanded copper foil in addition of the nylon peel ply fabric. The areal weight of the copper foil was 70 g/m² and the total final areal weight of the film after curing was about 148 g/m².

Comparative Examples 1-4: No UV Light Pretreatment

The thermoplastic substrate was treated only by wiping the surface with an isopropanol wipe to remove dust and (i.e., no UV light was applied). The respective surfacing film was overlaid to the PEEK surface and cured as described as above. The surfacing films used in these Comparative Examples are described in Table 2. In each case, visual inspection of the resulting surfacing film showed a smooth and even surface. In each case, cross-hatch evaluation gave a rating of OB.

TABLE 2

Comparison of results using various surfacing films and UV-treatments

| Example No. | Activation Treatment | Top Layer | Cross-hatch Layer |
|---|---|---|---|
| Comp. 1 | No UV | Surfacing film | 0 B |
| Ex. 1 | With UV | Surfacing film | 4 B |
| Comp. 2 | No UV | Lightning strike surfacing film | 0 B |
| Ex. 2 | With UV | Lightning strike surfacing film | 4 B |
| Comp. 3 | No UV | Peel and paint surfacing film | 0 B |
| Ex. 3 | With UV | Peel and paint surfacing film | 4 B |
| Comp. 4 | No UV | Lightning strike peel and paint film | 0 B |
| Ex. 4 | With UV | Lightning strike peel and paint film | 4 B |

Examples 1-4: Using a UV Light Pretreatment

The conditions of the Comparative Examples were repeated except that prior to overlaying the surfacing films on the thermoplastic carbon reinforced substrate Tenax-E TPCL PEEK-HTA40, the substrate was irradiated with UV light using a UVALOC 1000 source, fitted with a Mercury D-type bulb (iron doped) for 30 seconds. The pre-treatment intensities were for the various films are summarized in Table 3.

TABLE 3

Activating conditions, 30 seconds

| Radiation,[#] mW/cm² Top layer | Example 1 Surfacing film | Example 2 Lightning strike | Example 3 Peel and paint | Example 4 Lightning strike peel and paint |
|---|---|---|---|---|
| UVA | 127 | 127 | 102 | 115 |
| UVB | 127 | 107 | 79 | 79 |
| UVC | 30 | 23 | 17 | 20 |
| UVV | 85 | 73 | 64 | 78 |

[#]Intensities measured with a calibrated PowerPuck

In each case the evaluation of the bond strength by the cross-hatch test method resulted in a 4B score, indicating good adhesion. See Table 2.

As those skilled in the art will appreciate, numerous modifications and variations of the present disclosure are possible considering these teachings, and all such are contemplated hereby. All references cited herein are incorporated by reference herein, at least for their teachings in the context presented.

What is claimed:

1. A composite structure comprising a thermoplastic substrate directly bonded to a thermoset(ting) surfacing film by cross-polymer linkages formed between an actinic irradiated surface of the thermoplastic substrate and reactive groups of the thermoset(ting) surfacing film, the direct bonding defining an interface between the actinic irradiated surface of the thermoplastic substrate and a first surface of the thermoset (ting) surfacing film in the absence of any material not sourced from the thermoplastic substrate or the thermoset (ting) surfacing film, the thermoset(ting) surfacing film further comprising a second surface opposite the first surface of the thermoset(ting) surfacing film and a peelable material at or beneath the second surface, the peelable material permitting removal to provide a paint-ready surface.

2. The composite structure of claim 1, wherein the thermoplastic substrate comprises:

(a) polyaryletherketone selected from polyether ether ketone (PEEK), polyether ketone ketone (PEKK), polyether ketone (PEK); polyether ether ketone ketone (PEEKK); or polyether ketone ether ketone ketone (PEKEKK);

(b) a polymer containing a phenyl group directly attached to a carbonyl group, optionally wherein the carbonyl group is part of an amide group contained in a polyarylamide (PARA);

(c) a polyphenylene sulfide (PPS);

(d) a polyphenylene oxide (PPO); or (e) a polyetherimide (PEI).

3. The composite structure of claim 1, wherein the thermoplastic substrate comprises a thermoplastic polymer whose linkages are susceptible to at least partial photolytic cleavage upon irradiation by actinic radiation of sufficient intensity wherein the actinic radiation includes radiation with at least one wavelength in a range from about 10 nm to about 500 nm.

4. The composite structure of claim 1, wherein the thermoplastic substrate comprises a thermoplastic polymer whose linkages are susceptible to at least partial photolytic cleavage upon irradiation by at least one wavelength, optionally 2 to 4 wavelengths, of actinic radiation at an energy in a range from about 0.1 J/cm² to about 300 J/cm² at the at least one wavelength.

5. The composite structure of claim 1, wherein the thermoset(ting) surfacing film is uncured.

6. The composite structure of claim 1, wherein the thermoset(ting) surfacing film is partially cured.

7. The composite structure of claim 1, wherein the thermoset(ting) surfacing film is an epoxy-based thermoset(ting) surfacing film.

8. The composite structure of claim 7, wherein the epoxy-based thermoset(ting) surfacing film is a solid-form composite material comprising the peelable material and further comprises at least one particulate material suitable to use as an impact modifier contained within a thermoset(ting) resin.

9. The composite structure of claim 1, wherein the thermoset(ting) surfacing film is itself a solid-form composite material comprising the peelable material selected from the group consisting of one or more organic or inorganic fibers, fabrics, weaves, meshes, or porous sheets contained within a thermoset(ting) resin.

10. The composite structure of claim 1, wherein the peelable material is selected from the group consisting of a fluorinated or perfluorinated polymer, a nylon polymer, and aramid or imide fibers.

11. The composite structure of claim 1, wherein the thermoset(ting) surfacing film is a solid-form composite material comprising the peelable material contained within a thermoset(ting) resin, and further comprises at least one electrically conductive material, suitable to use in lightning strike protection, electric current dissipation, EMI shielding, or heat transfer applications.

12. The composite structure of claim 1, wherein the thermoset(ting) surfacing film is a multi-functional solid-form composite material further comprising a non-peelable functional material that remains in the multi-functional solid-form composite material after a peeling operation: (a) at least one electrically conductive material, suitable to use in lightning strike protection, electric current dissipation, EMI shielding, or heat transfer applications;

(b) at least one particulate filler or additive comprising nano-, micro-, and/or macro-dimensioned powders, particles, beads, flakes, whiskers, or fibers, wherein the at least one particulate filler or additive comprises a ceramic, polymer, glass, or metal/metalloid material or alloy thereof, optionally including a carbide, nitride, or oxide of aluminum, boron, silicon, tin, zirconium, or aluminum, carbon, copper, nickel, Sn-Zn, or stainless steel, or aramid; or (c) a UV resistant polymer or UV stabilizing additive.

13. The composite structure of claim 12, wherein the thermoset(ting) surfacing film comprises the at least one electrically conductive material suitable to use in lightning strike protection, the at least one electrically conductive material suitable to use in lightning strike protection including copper foil.

14. The composite structure of claim 1, wherein the thermoset(ting) surfacing film is adhered to the thermoplastic substrate directly bonded to a thermoset surfacing film at a strength sufficient to score at least a 3B, according to ASTM D3359-09 for a 45° cross-hatched tape test.

15. The composite structure of claim 1, prepared by steps comprising:

(a) irradiating a surface of the thermoplastic substrate with actinic radiation sufficient to activate the surface of the thermoplastic substrate before contacting the thermosetting or thermosettable surfacing film to the activated thermoplastic substrate surface;

(b) contacting the thermosetting or thermosettable surfacing film to the activated thermoplastic substrate surface; and (c) applying pressure, and optionally heat, to the thermosetting or thermosettable surfacing film against the thermoplastic substrate for a time and under conditions sufficient to form a direct bond between the thermoplastic substrate and the thermosetting or thermosettable surfacing film.

16. An aircraft component or an automobile component comprising the composite structure of claim 1.

17. The composite structure of claim 1, wherein the actinic irradiated surface includes photolytically cleaved groups.

18. The composite structure of claim 1, wherein the cross-polymer linkages are derived from activated pendant moieties.

19. The composite structure of claim 18, wherein the activated pendant moieties are selected from the group comprising —OH, —SH, —C(O)H, —C(O)OH, and —C(O)—NH.

20. The composite structure of claim 1, wherein the thermoset(ting) surfacing film has an areal weight of less than 0.150 pounds per square foot and thickness of 25 to 12,500 microns.

21. The composite structure of claim 1, wherein the thermoplastic substrate is adhered to the thermoset(ting) surfacing film along activated sections more than to non-activated sections corresponding to an irradiation pattern applied to the thermoplastic substrate.

* * * * *